US012662562B2

(12) United States Patent
Tortelli et al.

(10) Patent No.: US 12,662,562 B2
(45) Date of Patent: Jun. 23, 2026

(54) METHOD FOR MANUFACTURING LOW-MOLECULAR-WEIGHT POLYTETRAFLUOROETHYLENE

(71) Applicant: SYENSQO SPECIALTY POLYMERS ITALY S.p.A., Bollate (IT)

(72) Inventors: Vito Tortelli, Milan (IT); Cristiano Monzani, Trezzo sull'Adda (IT); Emanuela Antenucci, Saronno (IT); Eliana Ieva, Alessandria (IT)

(73) Assignee: SYENSQO SPECIALTY POLYMERS ITALY S.p.A., Bollate (IT)

( * ) Notice: Subject to any disclaimer, the term of this patent is extended or adjusted under 35 U.S.C. 154(b) by 1036 days.

(21) Appl. No.: 17/788,721

(22) PCT Filed: Dec. 21, 2020

(86) PCT No.: PCT/EP2020/087391
§ 371 (c)(1),
(2) Date: Jun. 23, 2022

(87) PCT Pub. No.: WO2021/130150
PCT Pub. Date: Jul. 1, 2021

(65) Prior Publication Data
US 2023/0032788 A1 Feb. 2, 2023

(30) Foreign Application Priority Data
Dec. 23, 2019 (EP) .................................... 19219405

(51) Int. Cl.
*C08F 114/26* (2006.01)
*C08F 8/50* (2006.01)
*C08J 3/28* (2006.01)
*C08L 27/18* (2006.01)

(52) U.S. Cl.
CPC .............. *C08F 114/26* (2013.01); *C08J 3/28* (2013.01); *C08L 27/18* (2013.01); *C08J 2327/18* (2013.01)

(58) Field of Classification Search
CPC ... C08F 114/26; C08F 8/50; C08J 3/28; C08J 2327/18; C08L 27/18
See application file for complete search history.

(56) References Cited

U.S. PATENT DOCUMENTS

| | | | |
|---|---|---|---|
| 5,891,573 A | 4/1999 | Neuberg et al. | |
| 5,985,949 A | 11/1999 | Seguchi et al. | |
| 2006/0030500 A1 | 2/2006 | Ota et al. | |
| 2019/0023818 A1 | 1/2019 | Yoshida et al. | |

FOREIGN PATENT DOCUMENTS

| | | |
|---|---|---|
| CN | 101824158 A | 9/2010 |
| DE | 2528374 A1 | 1/1977 |
| DE | 116626 B1 | 10/1986 |
| EP | 253400 A2 | 1/1988 |
| EP | 3733742 A1 | 11/2020 |
| JP | H10316761 A | 12/1998 |
| JP | H11116624 A | 4/1999 |
| JP | 2004010716 A | 1/2004 |
| RU | 2207351 C2 | 6/2003 |
| WO | 2019156053 A1 | 8/2019 |

OTHER PUBLICATIONS

Sun J. et al., "Modification of polytetrafluoroethylene by radiation 1. Improvement in high temperature properties and radiation stability", Radiation Physics and Chemistry (1994), 44(6), 655-9—Elsevier Science Ltd (5 pages).

Oshima A. et al., "Improvement of radiation resistance for polytetrafluoroethylene (PTFE) by radiation crosslinking", Radiation Physics and Chemistry (1997), 49(2), 279-284—Elsevier Science Ltd (6 pages).

Schierholz K. et al., "Electron beam irradiation of polytetrafluoroethylene in air: investigations on the thermal behaviour", Nuclear Instruments & Methods in Physics Research, Section B: Beam Interactions with Materials and Atoms (1999), 151(1-4), 232-237—Elsevier Science B.V. (6 pages).

Lappan U. et al., "Modification of polytetrafluoroethylene by electron beam irradiation in various atmospheres", Nuclear Instruments & Methods in Physics Research, Section B: Beam Interactions with Materials and Atoms (1999), 151(1-4), 222-226—Elsevier Science B.V. (5 pages).

Lappan U. et al., "Electron beam irradiation of polytetrafluoroethylene in vacuum at elevated temperature: an infrared spectroscopic study", Journal of Applied Polymer Science (1999), 74(6), 1571-1576—John Wiley & Sons, Inc. (6 pages).

Lunkwitz K. et al., "Modification of fluoropolymers by means of electron beam irradiation", Radiation Physics and Chemistry (2000), 57(3-6), 373-376—Elsevier Science Ltd (4 pages).

Appan U. et al., "Changes in the chemical structure of polytetrafluoroethylene induced by electron beam irradiation in the molten state", Radiation Physics and Chemistry (2000), 59(3), 317-322—Elsevier Science Ltd (6 pages).

(Continued)

*Primary Examiner* — Catherine S Branch
(74) *Attorney, Agent, or Firm* — Osha Bergman Watanabe & Burton LLP

(57) ABSTRACT

The invention relates to a method for manufacturing low-molecular-weight polytetrafluoroethylene, comprising: a) a first step of mixing high-molecular-weight polytetrafluoroethylene with at least one additive selected from the group consisting of ethers having formula $R^1$—O—$R^2$, wherein $R^1$ and $R^2$ are independently selected among $C_1$-$C_{10}$ straight or branched aliphatic group, $C_4$-$C_{10}$ alicyclic or heterocyclic groups, $C_5$-$C_{10}$ aromatic or heteroaromatic groups; (per)fluorinated vinyl ethers; (per)fluorinated olefins; and optionally substituted aromatic hydrocarbons, and b) a second step of irradiating the so obtained mixture with ionizing radiation, said second step b) being carried out substantially in the absence of oxygen.

19 Claims, No Drawings

(56)        References Cited

OTHER PUBLICATIONS

Standard ASTM D1238-04—Standard Test Method for Melt Flow Rates of Thermoplastics by Extrusion Plastometer, 2004, p. 1-13 (13 pages).

Standard ASTM D4895-18—Standard Specification for Polytetrafluoroethylene (PTFE) Resin Produced From Dispersion, 2018, p. 1-14 (14 pages).

International Search Report issued in International Application No. PCT/EP2020/087391, mailed May 14, 2021 (5 pages).

Written Opinion issued in International Application No. PCT/EP2020/087391, mailed May 14, 2021 (6 pages).

METHOD FOR MANUFACTURING LOW-MOLECULAR-WEIGHT POLYTETRAFLUOROETHYLENE

This application is a national stage entry under 35 U.S.C. § 371 of International Application No. PCT/EP2020/087391 filed 21 Dec. 2020, which claims priority to European Patent Application No. 19219405.8 filed on 23 Dec. 2019. The entire contents of these applications are explicitly incorporated herein by this reference.

TECHNICAL FIELD

The present invention relates to a method for producing low-molecular-weight polytetrafluoroethylene (PTFE). More in particular, the present invention relates to a method for producing low-molecular-weight PTFE which limits or even suppresses the generation of $C_4$ to $C_{14}$ perfluorocarboxylic acids (PFCAs) and salts thereof, notably perfluorooctanoic acid (PFOA) and salts thereof.

BACKGROUND ART

Low-molecular-weight polytetrafluoroethylene, also called PTFE wax or PTFE micropowder, has a molecular weight of several thousands to several hundred thousand grams per mole, much lower than that of high-molecular-weight PTFE, also referred to as regular PTFE, which is in the order of 106 to 107 grams per mole.

Besides retaining the functions of regular PTFE, low-molecular-weight PTFE is provided with high dispersibility, meaning that it can be used as additive especially in rubbers and plastics.

Low-molecular-weight PTFE is commonly manufactured by a method wherein scraps of regular PTFE are subjected to irradiation in order to effect a decomposition reaction. Known manufacturing methods employ irradiation in the presence of oxygen, which is particularly effective in rapidly increasing the degradation speed of PTFE and, hence, rapidly decreasing its melt viscosity.

However, oxygen is responsible for the generation of certain amounts of short-chain perfluorocarboxylic acids (PFCAs), in particular in the range of $C_4$ to $C_{14}$, which are presently under significant environmental concerns. Among them, perfluorooctanoic acid (PFOA) is particularly known to have high bioaccumulation.

Therefore, efforts have been devoted so far to provide methods for the manufacture of low-molecular-weight PTFE which are less likely to generate $C_4$ to $C_{14}$ perfluorocarboxylic acids, and accordingly to provide PTFE micropowders which are free or substantially free from such PFCAs.

Methods have been developed wherein the irradiation is performed substantially in the absence of oxygen, but in the presence of certain additives able to effect the degradation of PTFE and, therefore, the molecular weight decrease of PTFE at an acceptable rate. For instance, US 2019/0023818 discloses a method for manufacturing low-molecular-weight PTFE wherein additives are selected among hydrocarbons, chlorinated hydrocarbons, alcohols and carboxylic acids.

An increasingly growing need is felt for alternative additives which are able to limit or even suppress the generation of $C_4$ to $C_{14}$ perfluorocarboxylic acids, notably perfluorooctanoic acid.

SUMMARY OF INVENTION

The present invention relates to a method for manufacturing low-molecular-weight polytetrafluoroethylene (PTFE), comprising:

a) a first step of mixing high-molecular-weight polytetrafluoroethylene (PTFE) with at least one additive selected from the group consisting of: ethers having formula $R^1$—O—$R^2$, wherein $R^1$ and $R^2$ are independently selected among $C_1$-$C_{10}$ straight or branched aliphatic groups, $C_4$-$C_{10}$ alicyclic or heterocyclic groups, $C_5$-$C_{10}$ aromatic or heteroaromatic groups, and wherein $R^1$ and $R^2$ may form a $C_4$-$C_{10}$ aliphatic cyclic structure, optionally comprising heteroatoms, in particular oxygen; (per)fluorinated vinyl ethers; (per)fluorinated olefins; and
optionally substituted aromatic hydrocarbons, and
b) a second step of irradiating the so obtained mixture with ionizing radiation,
said second step b) being carried out substantially in the absence of oxygen.

According to another aspect, the present invention relates to low-molecular-weight polytetrafluoroethylene (PTFE) obtained with the above identified method.

The Applicant has surprisingly found that the method according to the present invention generates very minor amounts of $C_4$ to $C_{14}$ perfluorocarboxylic acids (PFCAs), notably very few amounts of perfluorooctanoic acid (PFOA).

DETAILED DESCRIPTION OF THE INVENTION

Described herein is a method for manufacturing low-molecular-weight PTFE, which comprises: a) a first step of mixing high-molecular-weight PTFE with at least one additive, and b) a second step of irradiating the mixture comprising the high-molecular-weight PTFE and the at least one additive with ionizing radiation, substantially in the absence of oxygen. The additive is selected from the group consisting of ethers having formula $R^1$—O—$R^2$, wherein $R^1$ and $R^2$ are independently selected among $C_1$-$C_{10}$ straight or branched aliphatic group, $C_4$-$C_{10}$ alicyclic or heterocyclic groups, $C_5$-$C_{10}$ aromatic or heteroaromatic groups, and wherein $R^1$ and $R^2$ may form a $C_4$-$C_{10}$ aliphatic cyclic structure, optionally comprising heteroatoms, in particular oxygen; (per)fluorinated vinyl ethers; (per)fluorinated olefins; and optionally substituted aromatic hydrocarbons.

It was surprisingly found that by using these additives, the generation of $C_4$ to $C_{14}$ perfluorocarboxylic acids was significantly reduced to 25 ppb or even less than 25 ppb each. In particular, the generation of perfluorooctanoic acid (PFOA) was reduced to even less than 10 ppb.

In the present description, unless otherwise indicated, the following terms are to be meant as follows.

The adjective "aliphatic" denotes any straight or branched chain comprising hydrogen and carbon atoms. Aliphatic groups can be saturated or unsaturated and can comprise one or more heteroatoms, like nitrogen, oxygen, sulfur and chlorine, in the chain, typically nitrogen, oxygen or sulfur.

The adjective "alicyclic" denotes any aliphatic cyclic group consisting of one or more all-carbon rings which may be either saturated or unsaturated.

The adjective "aromatic" denotes any mono- or poly-nuclear cyclic group having a number of π electrons equal to 4n+2, wherein n is 0 or any positive integer.

Alicyclic and aromatic groups can be substituted with one or more straight or branched alkyl or alkoxy groups and/or halogen atoms and/or can comprise one or more heteroatoms, like nitrogen, oxygen and sulfur, in the ring. Alicyclic groups comprising one or more heteroatoms, like nitrogen, oxygen and sulfur, in the ring are herein referred to as "heterocyclic groups". Aromatic groups comprising one or more heteroatoms, like nitrogen, oxygen and sulfur, in the ring are herein referred to as "heteroaromatic groups". Heteroatoms in heterocyclic or heteroaromatic groups are selected from the group consisting of oxygen, nitrogen and sulfur.

The term "hydrocarbon" denotes an organic compound consisting of hydrogen and carbon. An "aromatic hydrocarbon" consists of one core composed of one benzenic ring or of a plurality of benzenic rings fused together by sharing two or more neighboring ring carbon atoms. Aromatic hydrocarbons can comprise one or more heteroatoms, like nitrogen, oxygen and sulfur, in the ring.

The term "alkyl", as well as derivative terms such as "alkoxy", include within their scope straight chains and branched chains. Examples of alkyl groups are methyl, ethyl, propyl, isopropyl, butyl and isobutyl. Unless specifically stated otherwise, each alkyl group may be unsubstituted or substituted with one or more substituents selected from but not limited to hydroxy, sulfo, $C_1$-$C_6$ alkoxy, $C_1$-$C_6$ alkylthio, provided that the substituents are sterically compatible and the rules of chemical bonding and strain energy are satisfied.

The term "halogen" includes fluorine, chlorine, bromine and iodine.

When ranges are indicated, range ends are included.

The expression "high-molecular-weight PTFE" refers to PTFE having a standard specific gravity (SSG) of at least 2.130. The standard specific gravity (SSG) of high-molecular-weight PTFE does not exceed 2.300.

Preferably, the high-molecular-weight PTFE subjected to the first step a) has a standard specific gravity (SSG) of 2.130 to 2.230. The standard specific gravity (SSG) is a value determined in conformity with ASTM D4895. The standard specific gravity is used as an indicator of the molecular weight of the high-molecular-weight PTFE.

According to an embodiment of the invention, said at least one additive is an ether of formula $R^1$—O—$R^2$, wherein $R^1$ and $R^2$ are independently selected among $C_1$-$C_{10}$ straight or branched aliphatic groups, preferably $C_3$-$C_6$ straight or branched aliphatic groups, more preferably $C_3$-$C_4$ straight or branched aliphatic groups. Preferably, $R^1$ and $R^2$ are alkyl groups. More preferably, $R^1$ and $R^2$ are butyl groups or isopropyl groups.

$R^1$ and $R^2$ may alternatively form a $C_4$-$C_{10}$ aliphatic cyclic structure, optionally comprising heteroatoms, in particular oxygen. Notable non limiting examples of suitable cyclic ethers for use as additives in the inventive method are tetrahydrofuran, dioxane.

According to another embodiment of the invention, said at least one additive is a (per)fluorinated vinyl ether.

In a preferred embodiment, said (per)fluorinated vinyl ether is a (per)fluoroalkyl vinylether (MVE) having formula:

$$CF_2\text{=}CFOR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls. Preferably, Rr is-$CF_3$, —$CF_2CF_3$, —$CF_2CF_2CF_3$.

In another preferred embodiment, said (per)fluorinated vinyl ether is a (per)fluoro-alkylmethylenoxy-vinylether (MOVE) having formula:

$$CF_2\text{=}CFOCF_2OR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls. Preferably, $R_f$ is-$CF_2CF_3$ (MOVE1), —$CF_2CF_2OCF_3$ (MOVE2), or —$CF_3$ (MOVE3).

According to a further embodiment of the invention, said at least one additive is a (per)fluorinated olefin, preferably a (per)fluorinated vinyl derivative having formula:

$$CF_2\text{=}CFR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls.

Yet, according to an embodiment of the invention, said at least one additive is a substituted aromatic hydrocarbon. Preferably, said substituted aromatic hydrocarbon has from 6 to 18 carbon atoms, preferably from 6 to 12 carbon atoms, more preferably 6 carbon atoms.

Preferably, said aromatic hydrocarbon is substituted with one or more straight or branched alkyl groups and/or straight or branched alkoxy groups and/or halogen atoms. More preferably, said aromatic hydrocarbon is substituted with one or more straight or branched alkyl or alkoxy groups having from 1 to 8 carbon atoms, preferably from 1 to 6 carbon atoms, more preferably from 1 to 3 carbon atoms. When the aromatic hydrocarbon has more than one substituent, they can be in ortho, meta, para positions with respect to each other. Preferably, said at least one additive is an aromatic hydrocarbon having one substituent or an aromatic hydrocarbon having two substituents.

Preferably, said at least one additive is a substituted $C_6$ aromatic hydrocarbon. Preferably said $C_6$ aromatic hydrocarbon is substituted with $C_1$ alkyl and/or alkoxy groups. Preferably, said $C_6$ aromatic hydrocarbon is toluene or 1,3-dimethoxybenzene.

Preferably, said at least one additive selected among the above identified compounds is in an amount from 0.001 wt. % to 10 wt. %, from 0.01 wt. % to 10 wt. %, from 0.1 wt. % to 10 wt. %, from 0.001 wt. % to 5 wt. %, from 0.01 wt. % to 5 wt. %, from 0.1 wt. % to 5 wt. %, from 0.001 wt. % to 4 wt. %, from 0.01 wt. % to 4 wt. %, from 0.1 wt. % to 4 wt. %, from 0.001 wt. % to 2 wt. %, from 0.01 wt. % to 2 wt. %, from 0.1 wt. % to 2 wt. %, based on the total weight of the high-molecular-weight PTFE.

As already stated above, the second step b) of irradiating the mixture comprising the high-molecular-weight PTFE and the at least one additive is carried out substantially in the absence of oxygen. The expression "substantially in the absence of oxygen" means that the second step b) is carried out in an atmosphere which contains less than 5.0 vol. %, preferably less than 3.0 vol. %, more preferably less than 1.0 vol. %, even more preferably less than 0.1 vol. %, still more preferably less than 0.01 vol. %, of oxygen.

Preferably, the first step a) of mixing the high-molecular-weight PTFE with the at least one additive is also carried out substantially in the absence of oxygen, wherein the expression "substantially in the absence of oxygen" has the same meaning as above.

According to different embodiments, the second step b) is carried out in the presence of an inert gas and/or in the presence of an oxygen adsorbent. In an embodiment, the inert gas and/or the oxygen adsorbent are mixed with the high-molecular-weight PTFE and the at least one additive during the first step a). In another embodiment, the inert gas and/or the oxygen adsorbent are added to the mixture obtained from the first a), namely before irradiating the mixture according to the second step b).

Preferably, the inert gas is selected among nitrogen, helium, argon, or the like. Preferably, the inert gas is nitrogen.

The oxygen adsorbent may be any adsorbent capable of adsorbing oxygen. For instance, the oxygen adsorbent is selected among inorganic oxygen adsorbents such as iron-based, zinc-based, or hydrosulfite-based adsorbents, and organic oxygen adsorbents such as ascorbic acid-based, polyhydric alcohol-based, or activated carbon-based oxygen adsorbents. The oxygen adsorbent may be of either a water-dependent type which requires water for reacting with oxygen or self-reactive type which does not require water. The oxygen adsorbent is preferably of a self-reacting type. Preferably, the oxygen adsorbent is an iron-based self-reactive oxygen adsorbent.

Preferably, the ionizing radiation is selected among electron beams, ultraviolet rays, gamma rays, X-rays, neutron beams and high energy ions. Electron beams and gamma rays are preferred.

Preferably, the ionizing radiation has an exposure dose from 1 to 2500 kGy, from 1 to 1000 kGy, from 1 to 750 kGy, from 10 to 2500 kGy, from 10 to 1000 kGy, from 10 to 750 kGy, from 100 to 2500 kGy, from 100 to 1000 kGy, from 100 to 750 kGy.

The irradiation temperature may be any temperature from 5° C. to the melting point of PTFE, preferably from 5° C. to 320° C., more preferably from 5° C. to 300° C., even more preferably from 5° C. to 260° C.

The method according to the invention optionally comprises a third step c) during which the low-molecular-weight PTFE obtained from the second step b) is subjected to heating. Preferably, the heating is performed from 50° C. to 300° C., from 70° C. to 300° C., from 90° C. to 300° C., from 100° C. to 300° C., from 50° C. to 230° C., from 70° C. to 230° C., from 90° C. to 230° C., from 100° C. to 230° C., from 50° C. to 200° C., from 70° C. to 200° C., from 90° C. to 200° C., from 100° C. to 200° C., from 50° C. to 130° C., from 70° C. to 130° C., from 90° C. to 130° C., from 100° C. to 130° C.

Another object of the invention is the low-molecular-weight PTFE obtained with the method described above. The expression "low-molecular-weight PTFE" refers to PTFE having a melt flow index of at least 0.1 g/10 min determined in conformity with ASTM D 1238 by applying a weight of 10 Kg at 372° C.

Preferably, the low-molecular-weight PTFE has a melt flow index of at least 0.2 g/10 min, more preferably of at least 0.3 g/10 min, even more preferably of at least 0.5 g/10 min, still more preferably of at least 1.0 g/10 min, as determined in conformity with ASTM D 1238 by applying a weight of 10 Kg at 372° C. The melt flow index is used as an indicator of the molecular weight of the low-molecular-weight PTFE.

The Applicant found that the low-molecular-weight PTFE according to the invention does not contain carboxyl groups at the chain ends.

The low-molecular-weight PTFE has a melting point preferably from 324° C. to 337° C., more preferably from 330° C. to 337° C., even more preferably from 333° C. to 337° C., as determined according to the method described in the experimental section below.

Preferably, the low-molecular-weight PTFE of the invention contains $C_4$-$C_{14}$ perfluorocarboxylic acids (PFCAs) and salts thereof in an amount by mass of not more than 25 ppb each, more preferably not more than 20 ppb each, even more preferably not more than 15 ppb each, still more preferably not more than 10 ppb each, most preferably not more than 5 ppb each.

Preferably, the low-molecular-weight PTFE of the invention contains perfluorooctanoic acid (PFOA) and salts thereof in an amount by mass of not more than 25 ppb, more preferably not more than 20 ppb, even more preferably not more than 15 ppb, still more preferably not more than 10 ppb, yet more preferably not more than 5 ppb, most preferably not more than 2 ppm or even less than 2 ppb.

Preferably, the low-molecular-weight PTFE is in the form of powder. Preferably, the specific surface area of the powder is from 0.5 to 20 $m^2$/g. Preferably, the average particle size of the powder is from 0.5 to 200 μm, more preferably from 0.5 to 20 μm, even more preferably from 0.5 to 10 μm, still more preferably from 0.5 to 5 μm.

The invention is described in greater detail in the following experimental section by means of non-limiting examples.

EXPERIMENTAL SECTION

Materials

PTFE Algoflon® F5 FT is a high-molecular-weight PTFE and is commercially available from Solvay Specialty Polymers Italy.

Dibutyl ether, diphenyl ether, toluene and 1,3-dimethoxy-benzene were purchased from Sigma-Aldrich.

Diisopropyl ether was purchased from Merck.

MOVE1 is a perfluorinated vinylether of formula $CF_2$=$CFOCF_2OCF_2CF_3$ and is commercially available from Solvay Specialty Polymers Italy.

Ethanol was purchased from Carlo Erba Reagents.

FreshUS® is an oxygen adsorbent commercially available from FreshUS PAC

Methods

Determination of the Amount of Perfluoro-n-Octanoic Acid (PFOA) and Salts Thereof [Method A]

The amount of perfluoro-n-octanoic acid and salts thereof was determined using a liquid chromatography-mass spectrometer (Agilent Technologies Infinity 1290 II and Triple Quad 6495). Measurement powder (1 g) was extracted for 16 hours at 50° C. with methanol (3 ml). The resulting liquid phase was analyzed by multiple reaction monitoring (MRM). Acqueous Formic Acid solution (10 mmol/L, Phase A) and Formic Acid in Acetonitrile (10 mmol/L, Phase B) in gradient were used as mobile phase. A separation column (Acquity UPLC BEH $C_{18}$ 1.7 μm) was used at a column temperature 50° C. and an injection volume of 5 μl. Electrospray ionization (ESI) in a negative mode was used as the ionization method. The ratio of the molecular weight of precursor ions to the molecular weight of the product ions was measured to be 413/369. The amount of perfluoro-n-octanoic acid and salts thereof was calculated by the internal standard method (Perfluoro-n-[1,2,3,4-$^{13}C_4$]octanoic acid as internal standard). Perfluoro-n-[$^{13}C_8$]octanoic acid was used as SRS (Surrogate Recovery Standard). The detection limit of this measurement is 2 ppb.

Determination of the Amount of $C_4$-$C_{14}$Perfluorocarboxilic Acids (PFCAs) and Salts Thereof [Method B]

$C_4$-$C_{14}$ perfluorocarboxylic acids and salts thereof were detected using a liquid chromatography-mass spectrometer (Agilent Technologies Infinity 1290 and Triple Quad 6460). Measurement powder (0.35 g) was mixed with Acetone (3.5 g) and the mixture was sonicated for 15 minutes and agitated for 45 minutes. The resulting liquid phase was evaporated, reconstituted with methanol and the measurement was performed by MRM. The measurement conditions were based on the measurement conditions for perfluoro-n-octanoic acid. The ratio of the molecular weight of precursor ions to the molecular weight of product ions was measured to be 213/169 for perfluorobutanoic acid ($C_4$), 263/219 for perfluoropentanoic acid ($C_5$), 313/169 for perfluorohexanoic acid ($C_6$), 319/169 for perfluoroheptanoic acid ($C_7$), 369/169 for perfluorooctanoic acid ($C_8$), 419/219 for perfluorononanoic acid ($C_9$), 469/269 for perfluorodecanoic acid ($C_{10}$), 519/269 for perfluoroundecanoic acid ($C_{11}$), 613/569 for perfluorododecanoic acid ($C_{12}$), 663/619 for perfluorotridecanoic acid ($C_{13}$), 713/669 for perfluorotetradecanoic acid ($C_{14}$). The amount of each perfluorocarboxylic acid was calculated by the external standard method. Perfluoro-n-[$^{13}C_4$]butanoic acid, Perfluoro-n-[1,2,3,4,6-$^{13}C_5$]hexanoic acid, Perfluoro-n-[$^{13}C_8$]octanoic acid, Perfluoro-n-[$^{13}C_9$] nonanoic acid and Perfluoro-n-[1,2,3,4,5,6-$^{13}C_6$]decanoic acid were used as SRS (Surrogate Recovery Standard). The detection limit of this measurements for each perfluorocarboxylic acid is 25 ppb.

DSC

DSC analyses were carried out on Mettler Toledo DSC1 Star instrument according to ASTM D3418. A sample of about 10 mg of dried low-molecular-weight PTFE was heated from 220° C. to 370° C. at a rate of 10° C./min. The melting temperature ($T_m$) referred to below is the endothermic peak observed during the first heating cycle.

Measurement of the Melt Flow Index (MFI)

The melt flow index (MFI) was measured according to ASTM D 1238 standard method by applying a weight of 10 Kg at 372° C.

SYNTHESIS EXAMPLES

Example 1 (E1)

A multi-layer barrier bag (FoodSaver®) for food storage was charged with PTFE Algoflon® F5 FT (100 g) and, after deaeration through three cycles of vacuum/N2, dibutylether (4 g) was added under nitrogen. The bag was then heat-sealed under inert gas and irradiated at 200 kGy rays at room temperature. The resulting powder was then discharged and treated at 80° C. under vacuum in order to remove volatile byproducts. The melting temperature ($T_m$) and the melt flow index (MFI) of the resulting low molecular weight PTFE powder were determined.

Example 2 (E2)

The same procedure of Example 1 was applied, but diisopropyl ether (4 g) was added to PTFE Algoflon® F5 FT (100 g) instead of dibutylether. The melting temperature ($T_m$) and the melt flow index (MFI) of the resulting low molecular weight PTFE powder were determined.

Example 3 (E3)

The same procedure of Example 1 was applied, but toluene (4 g) was added to PTFE Algoflon® F5 FT (100 g) instead of dibutylether. The melting temperature ($T_m$) and the melt flow index (MFI) of the resulting low molecular weight PTFE powder were determined.

Example 4 (E4)

The same procedure of Example 1 was applied, but 1,3-dimethoxybenzene (4 g) was added to PTFE Algoflon® F5 FT (100 g) instead of dibutylether. The melting temperature ($T_m$) and the melt flow index (MFI) of the resulting low molecular weight PTFE powder were determined.

Example 5 (E5)

The same procedure of Example 1 was applied, but MOVE1 (4 g) was added to PTFE Algoflon® F5 FT (100 g)

instead of dibutylether. The melting temperature ($T_m$) and the melt flow index (MFI) of the resulting low molecular weight PTFE powder were determined.

Comparative Example 6 (CE6)

The same procedure of Example 1 was applied, but ethanol (4 g) was added to PTFE Algoflon® F5 FT (100 g) instead of dibutylether. The melting temperature ($T_m$) and the melt flow index (MFI) of the resulting low molecular weight PTFE powder was determined.

Example 7 (E7)

The same procedure of Example 1 was applied adding dibutylether (4 g) and FreshUS® oxygen adsorbent to PTFE Algoflon® F5 FT (100 g). The melting temperature ($T_m$) and the melt flow index (MFI) of the resulting low molecular weight PTFE powder were determined.

Example 8 (E8)

The same procedure of Example 1 was applied adding dibutylether (2 g) and FreshUS® oxygen adsorbent to PTFE Algoflon® F5 FT (100 g). The melting temperature ($T_m$) and the melt flow index (MFI) of the resulting low molecular weight PTFE powder were determined.

Example 9 (E9)

The same procedure of Example 1 was applied adding dibutylether (0.5 g) and FreshUS® oxygen adsorbent to PTFE Algoflon® F5 FT (100 g). The melting temperature ($T_m$) and the melt flow index (MFI) of the resulting low molecular weight PTFE powder were determined.

Example 10 (E10)

The same procedure of Example 1 was applied adding dibutylether (4 g) and FreshUS® oxygen adsorbent to PTFE Algoflon® F5 FT (100 g). The bag was irradiated at 150 kGy rays at room temperature instead of 200 kGy. The melting temperature ($T_m$) and the melt flow index (MFI) of the resulting low molecular weight PTFE powder were determined.

Example 11 (E11)

The same procedure of Example 1 was applied adding dibutylether (4 g) and FreshUS® oxygen adsorbent to PTFE Algoflon® F5 FT (100 g). The bag was irradiated at 300 kGy rays at room temperature instead of 200 kGy. The melting temperature ($T_m$) and the melt flow index (MFI) of the resulting low molecular weight PTFE powder were determined.

Example 12 (E12)

The same procedure of Example 1 was applied, but toluene (4 g) and FreshUS® oxygen adsorbent was added to PTFE Algoflon® F5 FT (100 g) instead of dibutylether. The melting temperature ($T_m$) and the melt flow index (MFI) of the resulting low molecular weight PTFE powder were determined.

Example 13 (E13)

The same procedure of Example 1 was applied, but toluene (2 g) and FreshUS® oxygen adsorbent was added to PTFE Algoflon® F5 FT (100 g) instead of dibutylether. The melting temperature ($T_m$) and the melt flow index (MFI) of the resulting low molecular weight PTFE powder were determined.

Example 14 (E14)

The same procedure of Example 1 was applied, but toluene (0.5 g) and FreshUS® oxygen adsorbent was added to PTFE Algoflon® F5 FT (100 g) instead of dibutylether. The melting temperature ($T_m$) and the melt flow index (MFI) of the resulting low molecular weight PTFE powder were determined.

Example 15 (E15)

The same procedure of Example 1 was applied, but toluene (4 g) and FreshUS® oxygen adsorbent was added to PTFE Algoflon® F5 FT (100 g) instead of dibutylether. The bag was irradiated at 150 kGy rays at room temperature instead of 200 kGy. The melting temperature ($T_m$) and the melt flow index (MFI) of the resulting low molecular weight PTFE powder were determined.

Example 16 (E16)

The same procedure of Example 1 was applied, but diphenylether (4 g) and FreshUS® oxygen adsorbent was added to PTFE Algoflon® F5 FT (100 g) instead of dibutylether. The melting temperature ($T_m$) and the melt flow index (MFI) of the resulting low molecular weight PTFE powder were determined.

Example 17 (E17)

The same procedure of Example 1 was applied, but diphenylether (2 g) and FreshUS® oxygen adsorbent was added to PTFE Algoflon® F5 FT (100 g) instead of dibutylether. The melting temperature ($T_m$) and the melt flow index (MFI) of the resulting low molecular weight PTFE powder were determined.

Results

Table 1 reports the amount by mass (ppb) of $C_4$-$C_{14}$ perfluorocarboxylic acids in the samples according to examples 1 to 5, 7 to 17 (E1 to E5, E7 to E17) and in the sample according to Comparative example 6 (CE6), determined according to Method B described above.

Table 2 reports the amount by mass (ppb) of perfluorooctanoic acid in the samples according to examples 1 to 5, 7 to 17 (E1 to E5, E7 to E17) and in the sample according to Comparative example 6 (CE6), determined according to Method A described above.

Table 3 reports the melting point ($T_m$) and the melt flow index (MFI) of the samples according to examples 1 to 5, 7 to 17 (E1 to E5, E7 to E17) and of the sample according to Comparative example 6 (CE6).

TABLE 1

|  | E1 | E2 | E3 | E4 | E5 | CE6 | E7 | E8 | E9 | E10 | E11 | E12 | E13 | E14 | E15 | E16 | E17 |
|---|---|---|---|---|---|---|---|---|---|---|---|---|---|---|---|---|---|
| $C_4$ | <25 | <25 | <25 | <25 | <25 | 33 | <25 | <25 | <25 | <25 | <25 | <25 | <25 | <25 | <25 | <25 | <25 |
| $C_5$ | <25 | <25 | <25 | <25 | <25 | <25 | <25 | <25 | <25 | <25 | <25 | <25 | <25 | <25 | <25 | <25 | <25 |
| $C_6$ | <25 | <25 | <25 | <25 | <25 | 30 | <25 | <25 | <25 | <25 | <25 | <25 | <25 | <25 | <25 | <25 | <25 |
| $C_7$ | <25 | <25 | <25 | <25 | <25 | 30 | <25 | <25 | <25 | <25 | <25 | <25 | <25 | <25 | <25 | <25 | <25 |
| $C_8$ | <25 | <25 | <25 | <25 | 25 | <25 | <25 | <25 | <25 | <25 | <25 | <25 | <25 | <25 | <25 | <25 | <25 |
| $C_9$ | <25 | <25 | <25 | <25 | <25 | <25 | <25 | <25 | <25 | <25 | <25 | <25 | <25 | <25 | <25 | <25 | <25 |
| $C_{10}$ | <25 | <25 | <25 | <25 | <25 | <25 | <25 | <25 | <25 | <25 | <25 | <25 | <25 | <25 | <25 | <25 | <25 |
| $C_{11}$ | <25 | <25 | <25 | <25 | <25 | <25 | <25 | <25 | <25 | <25 | <25 | <25 | <25 | <25 | <25 | <25 | <25 |
| $C_{12}$ | <25 | <25 | <25 | <25 | <25 | <25 | <25 | <25 | <25 | <25 | <25 | <25 | <25 | <25 | <25 | <25 | <25 |
| $C_{13}$ | <25 | <25 | <25 | <25 | <25 | <25 | <25 | <25 | <25 | <25 | <25 | <25 | <25 | <25 | <25 | <25 | <25 |
| $C_{14}$ | <25 | <25 | <25 | <25 | <25 | <25 | <25 | <25 | <25 | <25 | <25 | <25 | <25 | <25 | <25 | <25 | <25 |

TABLE 2

|  | E1 | E2 | E3 | E4 | E5 | CE6 | E7 | E8 | E9 | E10 | E11 | E12 | E13 | E14 | E15 | E16 | E17 |
|---|---|---|---|---|---|---|---|---|---|---|---|---|---|---|---|---|---|
| $C_8$ | 8.7 | 21 | 8.0 | 13 | 25 | 18 | 4.2 | 3.4 | 4.3 | 4.7 | 8.1 | 8.8 | 5.7 | 7.1 | 5.1 | 11 | 11 |

TABLE 3

|  | E1 | E2 | E3 | E4 | E5 | CE6 | E7 | E8 | E9 | E10 | E11 | E12 | E13 | E14 | E15 | E16 | E17 |
|---|---|---|---|---|---|---|---|---|---|---|---|---|---|---|---|---|---|
| $T_m$ [° C.] | 335.4 | 334.8 | 336.0 | 336.6 | 335.9 | 333.7 | 337.3 | 337.4 | N.A | 337.9 | 336.8 | 337.9 | 337.4 | N.A | 338.4 | 337.6 | 337.1 |
| MFI [g/10 min] | 0.1 | 0.3 | 0.2 | 0.3 | 0.3 | 0.6 | 0.1 | 0.1 | N.A | 0.1 | 0.1 | 0.1 | 0.1 | N.A | 0.1 | 0.1 | 0.1 |

The invention claimed is:

1. A method for manufacturing low-molecular-weight polytetrafluoroethylene (PTFE), comprising:
   a) a first step of mixing high-molecular-weight polytetrafluoroethylene (PTFE) with at least one additive selected from the group consisting of:
      ethers having formula $R^1$—O—$R^2$, wherein $R^1$ and $R^2$ are independently selected among $C_1$-$C_{10}$ straight or branched aliphatic group, $C_4$-$C_{10}$ alicyclic or heterocyclic groups, $C_5$-$C_{10}$ aromatic or heteroaromatic groups and wherein $R^1$ and $R^2$ may form a $C_4$-$C_{10}$ aliphatic cyclic structure, optionally comprising heteroatoms; (per)fluorinated vinyl ethers; (per)fluorinated olefins; and aromatic hydrocarbons substituted with one or more straight or branched alkyl or alkoxy group and/or halogen atom, and
   b) a second step of irradiating the so obtained mixture with ionizing radiation,
   said second step b) being carried out substantially in the absence of oxygen.

2. The method according to claim 1 wherein the low-molecular-weight PTFE has a melt flow index of at least 0.1 g/10 min, determined according to ASTM D 1238 by applying a weight of 10 Kg at 372° C.

3. The method according to claim 1 wherein the high-molecular-weight polytetrafluoroethylene (PTFE) has a standard specific gravity, determined according to ASTM D4895, of at least 2.130.

4. The method according to claim 1, wherein said at least one additive is an ether of formula $R^1$—O—$R^2$, wherein $R^1$ and $R^2$ are independently selected from the group consisting of $C_3$-$C_6$ straight or branched aliphatic groups.

5. The method according to claim 4, wherein $R^1$ and $R^2$ are butyl groups or isopropyl groups.

6. The method according to claim 1, wherein said at least one additive is a (per)fluoroalkyl vinylether (MVE) having formula:

$$CF_2=CFOR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls.

7. The method according to claim 1, wherein said at least one additive is a (per)fluoro-alkylmethylenoxy-vinylether (MOVE) having formula:

$$CF_2=CFOCF_2OR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls.

8. The method according to claim 7, wherein $R_f$ is selected from the group consisting of —$CF_2CF_3$ (MOVE1), —$CF_2CF_{2O}CF_3$ (MOVE2), or —$CF_3$ (MOVE3).

9. The method according to claim 1, wherein said at least one additive is a (per)fluorinated vinyl derivative having formula:

$$CF_2=CFR_f$$

wherein $R_f$ is selected from the group consisting of $C_1$-$C_6$ (per)fluoroalkyls, $C_5$-$C_6$ cyclic (per)fluoroalkyls, and $C_2$-$C_6$ (per)fluorooxyalkyls.

10. The method according to claim 1, wherein said at least one additive is a aromatic hydrocarbon substituted with one or more straight or branched alkyl or alkoxy groups and/or halogen atoms.

11. The method according to claim 10, wherein said at least one additive is an aromatic hydrocarbon substituted with one or two groups selected from the group consisting of straight or branched alkyl or alkoxy groups and/or halogen atoms.

12. The method according to claim 10, wherein said at least one additive is a substituted $C_6$ aromatic hydrocarbon.

13. The method according to claim 1, wherein said at least one additive is in an amount from 0.001 wt. % to 10 wt. %, based on the total weight of the high-molecular-weight PTFE.

14. The method according to claim 1, wherein the second step b) is carried out in the presence of an inert gas and/or an oxygen adsorbent.

15. The method according to claim 1, wherein the ionizing radiation is selected from the group consisting of electron beams, ultraviolet rays, gamma rays, X-rays, neutron beams and high energy ions.

16. The method according to claim 1, wherein said at least one additive is an ether of formula $R^1$—O—$R^2$, wherein $R^1$ and $R^2$ are independently selected from the group consisting of $C_3$-$C_4$ straight or branched aliphatic groups.

17. The method according to claim 1, wherein said at least one additive is an aromatic hydrocarbon substituted with one or more $C_1$-$C_8$ alkyl and/or alkoxy groups.

18. The method according to claim 10, wherein said at least one additive is a substituted $C_6$ aromatic hydrocarbon, said $C_6$ aromatic hydrocarbon being substituted with $C_1$ alkyl and/or alkoxy groups.

19. The method according to claim 1, wherein said at least one additive is in an amount from 0.01 wt. % to 5 wt. %, based on the total weight of the high-molecular-weight PTFE.

* * * * *